(12) United States Patent
Yanamadala et al.

(10) Patent No.: US 10,860,771 B2
(45) Date of Patent: Dec. 8, 2020

(54) SIDE CHANNEL AWARE AUTOMATIC PLACE AND ROUTE

(71) Applicant: CHAOLOGIX, INC., Gainesville, FL (US)

(72) Inventors: Subbayya Chowdary Yanamadala, Dallas, TX (US); Daniel F. Yannette, Satellite Beach, FL (US); Brent Arnold Myers, Palm Beach, FL (US)

(73) Assignee: CHAOLOGIX, INC., Gainesville, FL (US)

( * ) Notice: Subject to any disclaimer, the term of this patent is extended or adjusted under 35 U.S.C. 154(b) by 0 days.

(21) Appl. No.: 16/076,304

(22) PCT Filed: Feb. 7, 2017

(86) PCT No.: PCT/US2017/016771
§ 371 (c)(1),
(2) Date: Aug. 7, 2018

(87) PCT Pub. No.: WO2017/139241
PCT Pub. Date: Aug. 17, 2017

(65) Prior Publication Data
US 2019/0042688 A1 Feb. 7, 2019

Related U.S. Application Data

(60) Provisional application No. 62/292,685, filed on Feb. 8, 2016.

(51) Int. Cl.
*G06F 30/394* (2020.01)
*G05F 1/59* (2006.01)
(Continued)

(52) U.S. Cl.
CPC .............. *G06F 30/394* (2020.01); *G05F 1/59* (2013.01); *G06F 21/755* (2017.08);
(Continued)

(58) Field of Classification Search
CPC .... G06F 30/394; G06F 30/392; G06F 30/327; G06F 30/30; G06F 1/59; G06F 17/5077;
(Continued)

(56) References Cited

U.S. PATENT DOCUMENTS 4,616,145 A * 10/1986 Myers ................. H03F 3/45479
327/309
5,216,586 A * 6/1993 Saito .......................... G05F 1/59
323/901
(Continued)

FOREIGN PATENT DOCUMENTS

CN 1649129 A 8/2005
CN 1750012 A 3/2006
(Continued)

OTHER PUBLICATIONS

Office Action Issued in Chinese Application No. 201780009784.6, dated Oct. 9, 2019, 15 pages.
(Continued)

*Primary Examiner* — Helen Rossoshek
(74) *Attorney, Agent, or Firm* — Talem IP Law, LLP (57) ABSTRACT

A power planning phase module, a placement phase module, and a routing phase module are provided that can replace, supplement, or enhance existing electronic design automation (EDA) software tools. The power planning phase module adds distributed power sources and a network of switching elements to the power frame or ring assigned to regions of a chip (that may be identified during a floor planning stage). The placement phase module optimizes a number and type of cells attached to each power source of the distributed power sources already added or to be added during the power planning phase. The routing phase module optimizes routing length to, for example, mask power consumption.

5 Claims, 5 Drawing Sheets

(51) Int. Cl.
*G06F 30/327* (2020.01)
*G06F 30/392* (2020.01)
*G06F 21/75* (2013.01)
*G06F 30/30* (2020.01)
*G06F 119/06* (2020.01)

(52) U.S. Cl.
CPC .......... *G06F 30/327* (2020.01); *G06F 30/392* (2020.01); *G06F 30/30* (2020.01); *G06F 2119/06* (2020.01)

(58) Field of Classification Search
CPC ............... G06F 17/5045; G06F 17/505; G06F 17/5072; G06F 2217/78; G06F 2119/06; G06F 21/755; G06F 2207/7266; H04L 9/003
See application file for complete search history.

(56) References Cited

U.S. PATENT DOCUMENTS

| | | | |
|---|---|---|---|
| 5,656,834 A * | 8/1997 | Grzyb | H01L 27/0207 257/203 |
| 6,002,268 A * | 12/1999 | Sasaki | H03K 17/6257 326/38 |
| 6,397,170 B1 * | 5/2002 | Dean | G06F 30/327 703/14 |
| 6,581,841 B1 * | 6/2003 | Christoffersen | G06F 21/755 235/380 |
| 6,711,719 B2 * | 3/2004 | Cohn | G06F 30/327 716/104 |
| 6,795,347 B2 * | 9/2004 | Ausserlechner | G11C 16/0441 365/185.18 |
| 6,938,233 B2 * | 8/2005 | Satoh | G06F 30/33 716/113 |
| 6,950,998 B1 * | 9/2005 | Tuan | G06F 30/394 716/113 |
| 7,000,204 B2 * | 2/2006 | McGuffin | G06F 30/33 716/109 |
| 7,079,994 B2 * | 7/2006 | Inanami | G06Q 20/20 703/6 |
| 7,151,381 B2 * | 12/2006 | Fraser | A01C 15/02 324/664 |
| 7,181,720 B2 * | 2/2007 | Stammermann | G06F 30/30 716/104 |
| 7,200,832 B2 * | 4/2007 | Butt | G06F 30/30 326/30 |
| 7,231,625 B2 * | 6/2007 | Dillon | G06F 30/392 716/120 |
| 7,302,660 B2 * | 11/2007 | Shimamura | H01L 27/11807 257/206 |
| 7,418,683 B1 * | 8/2008 | Sonnard | G06F 30/398 716/122 |
| 7,480,875 B2 * | 1/2009 | Satoh | G06F 30/367 716/132 |
| 7,589,361 B2 * | 9/2009 | Takahata | G06F 30/39 257/206 |
| 7,761,831 B2 * | 7/2010 | Mai | H01L 27/0207 327/334 |
| 7,805,697 B2 * | 9/2010 | Wood | G06F 30/327 716/113 |
| 7,921,397 B2 * | 4/2011 | Yamaguchi | G06F 30/39 716/119 |
| 7,994,543 B2 * | 8/2011 | Wu | H01L 27/0629 257/207 |
| 8,225,248 B2 * | 7/2012 | Chen | G06F 30/367 716/106 |
| 8,324,937 B2 | 12/2012 | Verbauwhede et al. | |
| 8,359,173 B2 * | 1/2013 | DiaaEldin | G06F 30/367 702/60 |
| 8,381,151 B1 * | 2/2013 | Rochel | G06F 30/367 716/109 |
| 8,504,968 B2 | 8/2013 | Newcomb | |
| 8,526,218 B2 * | 9/2013 | Egan | G11C 11/413 365/154 |
| 8,701,068 B2 * | 4/2014 | McElvain | H01L 23/5225 716/115 |
| 8,724,353 B1 * | 5/2014 | Giuliano | H02M 1/088 363/60 |
| 8,881,086 B2 * | 11/2014 | McElvain | H01L 23/5225 716/122 |
| 8,912,814 B2 * | 12/2014 | Yannette | H03K 19/003 326/8 |
| 8,912,816 B2 * | 12/2014 | Yannette | G06F 21/725 323/288 |
| 10,164,768 B1 * | 12/2018 | Ramaraju | H04L 9/003 |
| 10,374,512 B2 * | 8/2019 | Szczeszynski | H02M 1/08 |
| 10,539,997 B2 * | 1/2020 | Samson | G11C 7/22 |
| 2001/0039645 A1 * | 11/2001 | Uchida | H01L 23/528 716/127 |
| 2005/0129348 A1 * | 6/2005 | Iwasaki | G06F 30/30 385/14 |
| 2005/0172253 A1 | 8/2005 | Osanai | |
| 2005/0225365 A1 * | 10/2005 | Wood | G06F 1/12 327/141 |
| 2006/0054935 A1 | 3/2006 | Takahata | |
| 2007/0234266 A1 * | 10/2007 | Chen | G06F 30/34 716/113 |
| 2008/0115092 A1 * | 5/2008 | Nair | G06F 30/30 716/120 |
| 2011/0276937 A1 | 11/2011 | Waller | |
| 2012/0248595 A1 * | 10/2012 | Or-Bach | H01L 21/6835 257/706 |
| 2013/0248957 A1 * | 9/2013 | Kito | H01L 27/0733 257/296 |
| 2014/0040847 A1 | 2/2014 | Milinichik et al. | |
| 2014/0167837 A1 | 6/2014 | Yannette et al. | |
| 2014/0282340 A1 * | 9/2014 | Sundareswaran | G06F 30/392 716/122 |
| 2015/0061410 A1 * | 3/2015 | Tamura | G11C 5/06 307/126 |
| 2015/0130505 A1 * | 5/2015 | Yannette | G06F 21/725 326/8 |
| 2015/0339420 A1 * | 11/2015 | Fish | H03K 19/20 716/102 |
| 2015/0379309 A1 * | 12/2015 | Yannette | G06F 21/725 326/8 |
| 2016/0314230 A1 * | 10/2016 | Dufour | G06F 30/30 |
| 2017/0093184 A1 * | 3/2017 | Johnson | H02J 7/0024 |
| 2017/0177055 A1 * | 6/2017 | Whatmough | G06F 1/08 |
| 2018/0034468 A1 * | 2/2018 | Faisal | H03L 7/0997 |
| 2019/0198530 A1 * | 6/2019 | Hino | H01L 27/0207 |

FOREIGN PATENT DOCUMENTS

| | | |
|---|---|---|
| CN | 103577634 A | 2/2014 |
| EP | 2669756 A1 | 12/2013 |
| WO | 2012101898 A1 | 8/2012 |

OTHER PUBLICATIONS

"International Search Report and Written Opinion Issued in PCT Application No. PCT/US2017/016771", dated May 25, 2017, 10 Pages.

Office Action issued in Chinese Application No. 201780009784.6, dated Aug. 4, 2020, 7 pages.

\* cited by examiner

SIDE CHANNEL AWARE AUTOMATIC PLACE AND ROUTE

CROSS REFERENCE TO RELATED APPLICATION

This application claims the benefit of U.S. Provisional Patent Application Ser. No. 62/292,685, filed Feb. 8, 2016.

BACKGROUND

The design process for electronic circuits includes a step for placement of circuit elements and routing of wires and interconnections. This can be carried out at the chip level—for integrated circuits or a field programmable gate array—or at a circuit board level—for printed circuit boards or other circuit packages. Electronic design automation (EDA) tools, such as available through Cadence Design Systems, Inc. and Synopsys, Inc., are used during the place and route stage to optimize arrangements and enable increased complexity in design (as compared to manual layout).

The physical design stage of an integrated circuit design process generally includes logic synthesis, floor planning, power planning, placement, clock tree synthesis, routing, verification, and "tapeout" (export of data in form for manufacturing). These stages may be carried out using associated tools that may individually or together form an EDA tool. For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools.

BRIEF SUMMARY

Side channel aware automatic place and route tools and techniques are described that can be incorporated into or supplement electronic design automation (EDA) tools to enable automated inclusion and arrangement of elements that make it difficult to mount side channel analysis attacks on a core design.

A power planning phase module, a placement phase module, and a routing phase module are provided that can replace, supplement, or enhance existing EDA modules. The power planning phase module adds distributed power sources and/or a network of switching elements to the power frame(s) or ring(s) assigned to regions of a chip (that may be identified during a floor planning stage). The placement phase module optimizes a number and type of cells attached to each power source of the distributed power sources added during the power planning phase. The routing phase module optimizes routing length to, for example, mask power consumption.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DISCLOSURE

Side channel aware automatic place and route tools and techniques are described that can be incorporated into or supplement electronic design automation (EDA) tools to enable automated inclusion and arrangement of elements that make it difficult to mount side channel analysis attacks on a core design.

Figure 1:
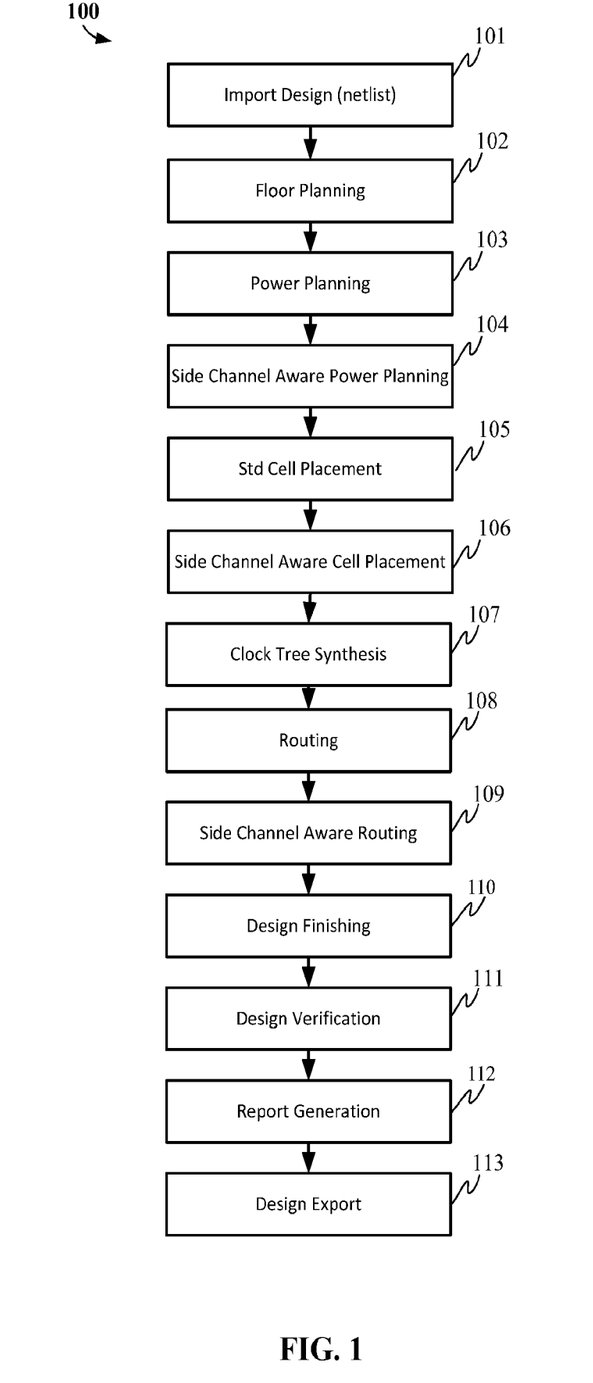
FIG. 1 shows a process flow diagram of an example EDA process.

FIG. 1 shows a process flow diagram of an example EDA process. The example EDA process 100 can be carried out by a single software tool, by an EDA platform that integrates multiple software tools (e.g., various modules available from an EDA application provider), or by multiple software tools. Referring to FIG. 1, the EDA process 100 can begin by importing of a design into a tool (101). This design can be in the form of a netlist. A netlist describes the connectivity of a circuit and may be in a format such as Verilog, VHDL, Spice, or other languages that can be synthesized and used by placement and routing tools (before manufacturing preparation). Optionally, an initial floor planning stage (102) can be carried out in which regions for certain circuit elements are identified and partitioned accordingly. In addition, power planning (103) can be included to arrange one or more power frames and/or rings for the circuit element regions.

Here, a side channel aware power planning stage may occur (104). The side channel aware power planning stage may be carried out by a power planning phase module. In operation 104, distributed power sources and a network of switching elements are added to the power frame(s) and/or rings. The particular arrangement and number may initially be based on the number and type of elements indicated in the netlist or those identified during floor planning partitioning (102).

Then, using the netlist, standard cell placement can be carried out (105). During placement, a synthesized circuit netlist and a technology library are used to create a valid placement layout. Standard cells (from a technology library) can be used to facilitate placement (as the cells are of known size and characteristics). As part of the standard cell placement, or after initial placement of the standard cells, a side channel aware cell placement is carried out (106). The side channel aware cell placement may be carried out by a placement phase module. Subsequent to the placement of cells and part of or subsequent to the side channel aware cell placement of operation 106, the cells are attached in a manner to receive power from the distributed power sources. The attach ratio (number of standard cells attached to each power source) can be determined by factors including, but not limited to, the type of standard cell (its load), expected switching activity, and other operating and environmental conditions (e.g., operating voltage range, clock frequency, operating temperature range). For example, the placement of cells for attachment to a power source can be based on types of gates (e.g., whether an AND gate or a NOR gate). In one optimization scenario, the side channel aware cell placement avoids or minimizes a cluster of a same type of gate (e.g., to not cluster AND gates together). The placement of the standard cells can be optimized to result in a favorable attach ratio in order to decrease the area and power consumption overheads. The number of gates attached to be supported by a particular power source can vary across power sources since the number may be based on the load/type of gate; rather than the number of gates.

Following placement, clock tree synthesis and optimization can be performed (107). Clock balancing can be performed after placement to improve performance, including reduction of clock skew. The placement phase—from power planning through clock tree synthesis can be iterative for optimization. In addition, although the side channel aware power planning stage 104 is described before the placement stages, in some cases, the side channel aware power planning stage is applied after placement (but before routing).

Following placement, routing can be performed (108). Where placement determines the location of each active element or component, the routing step adds the wires needed to properly connect the placed components while obeying design rules. During the routing phase, a side channel aware routing process (109) can be performed to mask power consumption (which may be carried out by a routing phase module). In operation 109, lengths of interconnects or other wiring can be optimized/adjusted for length to hide or obfuscate the power consumption. The distributed power sources and isolating switching elements are connected to the placed cells based on functional logic and to optimize data leakage through power signature. In some cases, the length of a route is made longer than would be expected when simply obeying design rules or optimizing for certain clocking.

Through side channel aware power planning and at least one of the side channel aware placement and side channel aware routing, the observed power signature variation (and even electromagnetic radiation variation) may be mitigated.

Design finishing (110), design verification (111), report generation (112), and design export (113) can be carried out using any suitable technique such as available by current EDA systems. During the design verification (111), it can be determined that the additional components such as the switches and the charge storage devices added during the power planning phase do not adversely impact the functional output of the design.

A software tool or set of tools that optimize the design, layout, placement and routing of the gates, circuit elements, design blocks and chips can do so, in part, by iterating one or more of these processes with goals of mitigating the dependence of the power, voltage, current, electromagnetic radiation on the switching activity of the gates, circuit elements, design blocks and chips and/or the data processed, stored, and/or transported by gates, circuit elements, design blocks and chips. Other goals for optimization can include, but are not limited to, reducing the area, power consumption, speed of operation, testability, and manufacturability of the gates, circuit elements, design blocks, integrated circuits and chips.

Figure 2A:
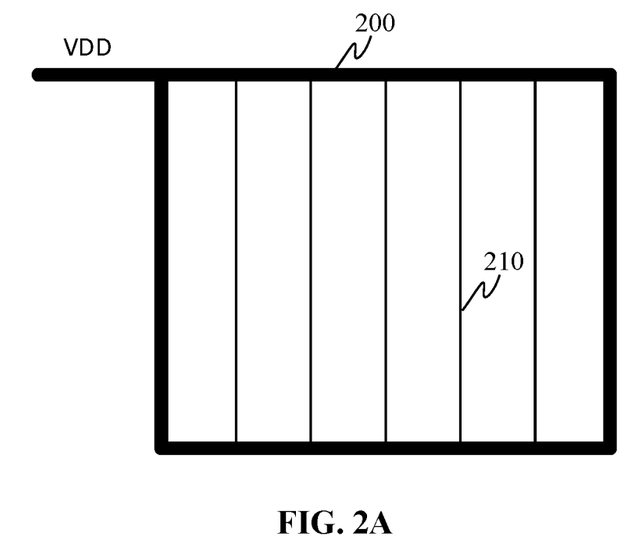
FIGS. 2A and 2B show simplified representational diagrams of a power frame (FIG. 2A) and an example network generated by a side channel aware power planning phase (FIG. 2B).
Figure 2B:
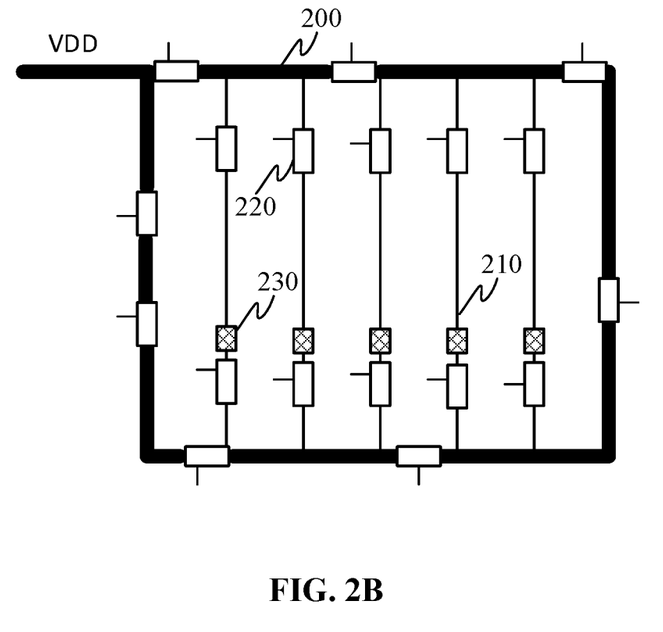

FIGS. 2A and 2B show simplified representational diagrams of a power frame (FIG. 2A) and an example network generated by a side channel aware power planning phase (FIG. 2B). As illustrated in FIG. 2A, a power frame 200 generally is formed in a ring, or frame, around a region in which circuit blocks will be located. A power grid of power rails 210 would be established at this stage or at a later stage for connecting underlying circuit blocks to the frame at appropriately positioned connectors. However, by executing the side channel aware power planning module 104 (e.g., by executing the software code stored at a location accessible by a processor of a computing system), instead of power rails 210 directly connected to the metal frame 200, distributed power sources and switching elements are added to the power lines.

For example, as shown in FIG. 2B, the power frame/rings 200 are built in a manner that creates a network of distributed power sources—using charge storage devices 230. These charge storage devices 230 can store charge and power a logic gate/gates (or other circuit element). Examples of charge storage devices 230 include capacitors (from passive or active components). A network of switching elements 220 become part of the power frame so that the distributed power sources (from the charge storage devices) can be isolated and the power signature created by the distributed power sources can be inhibited from being observed on external power rails.

It should be understood that both the power rails/frames (positive, negative, etc.) and ground rails/frames can have the side channel aware power planning module applied. In addition, in some cases, the power grid of power rails may or may not place all cells in an isolated power grid. For example, only those cells that contribute to secure leakage would be isolated while other cells could be placed outside the isolated power grid. The cells outside the isolated power grid can be used to add to the ambient noise to further improve side channel resistance.

Figure 3:
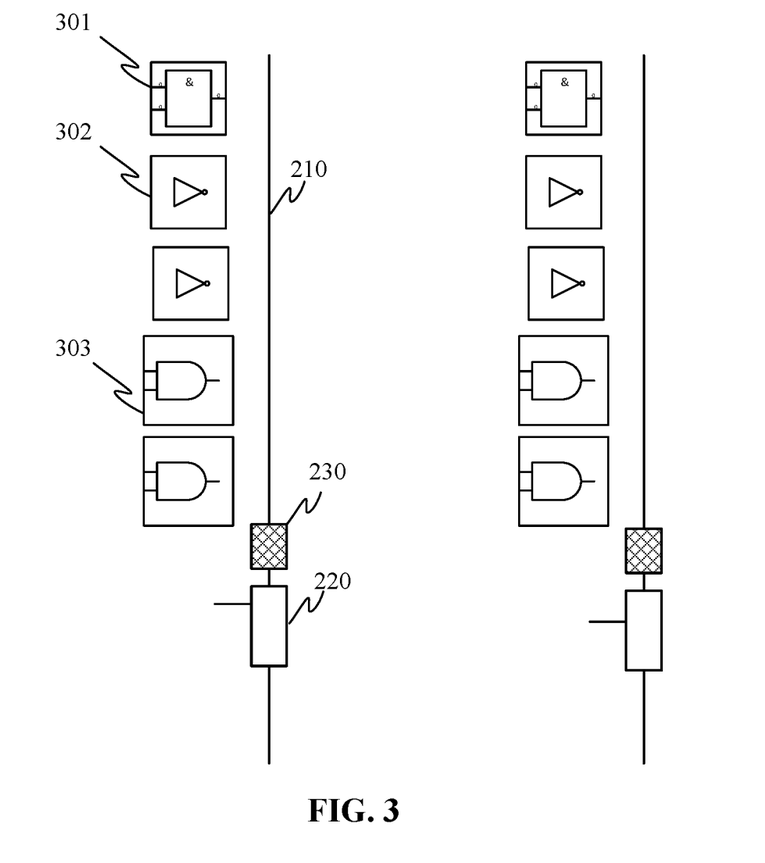
FIG. 3 shows a simplified representational diagram of attached cells a generated by a side channel aware placement phase.

FIG. 3 shows a simplified representational diagram of attached cells a generated by a side channel aware placement phase. As described with respect to operation 106, the placement of standard cells is optimized to result in a favorable attach ratio the distributed power sources (charge storage device 230 and switching element 220) so that loads supported by each charge storage device 230 can be optimized. It should be understood that the loads can be distributed uniformly or have other distribution characteristics. As shown in FIG. 3, a set of standard cells with a logic gate 301, two inverters 302, and two AND gates 303 are provided so that there is not a cluster of a same type of gate.

Figure 4:
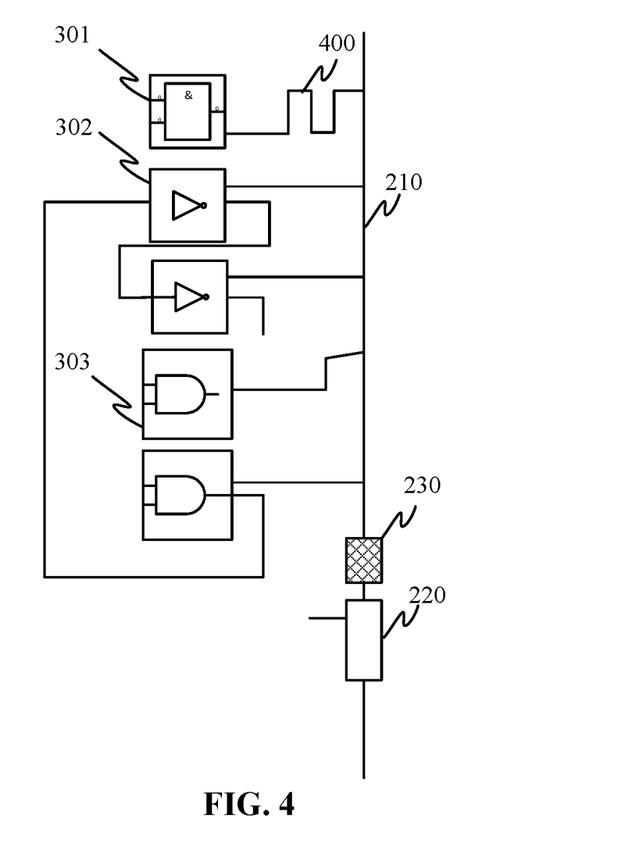
FIG. 4 shows a simplified representational diagram of attached cells with routing variation generated by a side channel aware routing phase.

FIG. 4 shows a simplified representational diagram of attached cells with routing variation generated by a side channel aware routing phase. In operation 109 side channel aware routing may adjust the lengths of the lines 400 between a cell and the power rail 210, between cells, and even the lengths of the power rails.

Figure 5:
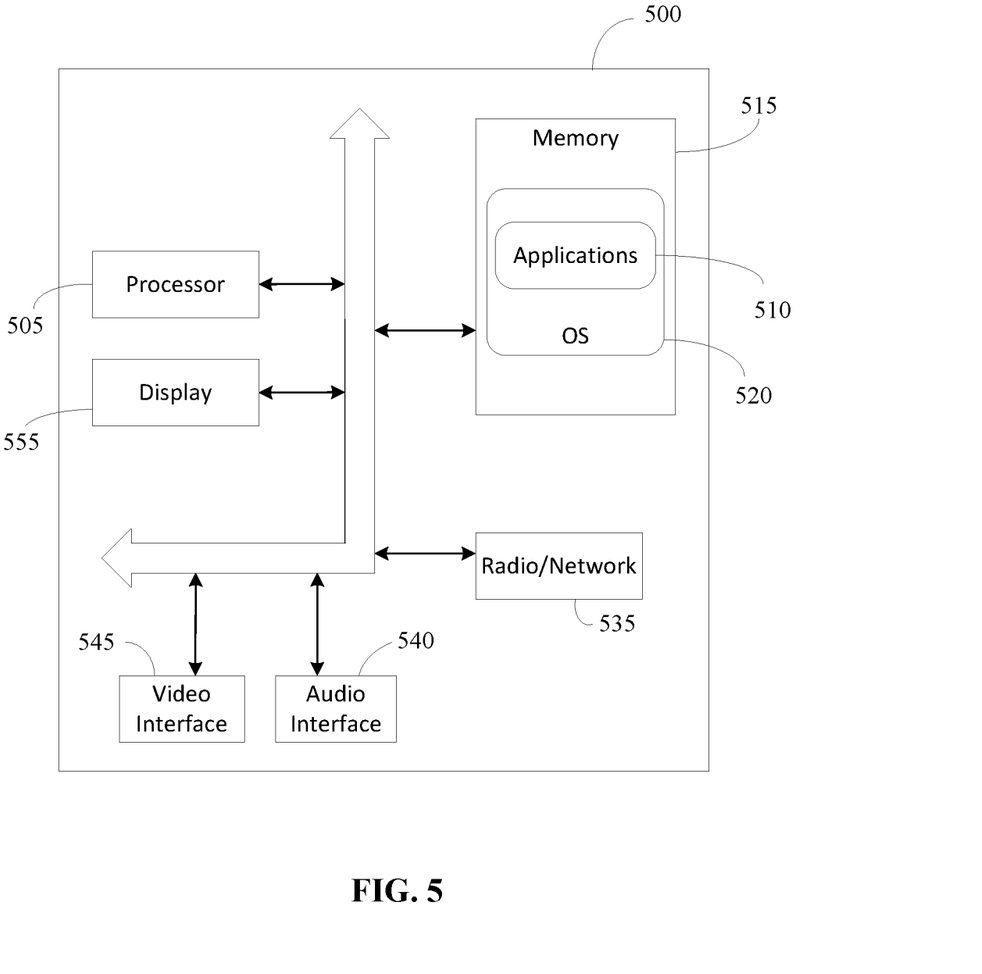
FIG. 5 is a block diagram illustrating components of a computing device used in some embodiments.

FIG. 5 is a block diagram illustrating components of a computing device used in some embodiments. For example, system 500 can be used in implementing a computing device executing an EDA software tool for one or more of the processes 100, including the side channel aware planning, placement, and/or routing processes illustrated in FIGS. 2A, 2B, 3, and 4. It should be understood that aspects of the system described herein are applicable to both mobile and traditional desktop computers, as well as server computers and other computer systems. Accordingly, certain aspects described with respect to system 500 are applicable to server(s) on which a software tool may be carried out in the case of networked computing stations or web based tools.

For example, system 500 includes a processor 505 (e.g., CPU, GPU, FPGA) that processes data according to instructions of one or more application programs 510 (which can include the modules described herein for the EDA tools), and/or operating system (OS) 520. The processor 505 may be, or is included in, a system-on-chip (SoC) along with one or more other components such as network connectivity components, sensors, video display components. Other processing systems may be used. The one or more application programs 510 may be loaded into memory 515 and run on or in association with the operating system 520.

System 500 may also include a radio/network interface 535 that performs the function of transmitting and receiving radio frequency communications. The radio/network interface 535 facilitates wireless connectivity between system 500 and the "outside world," via a communications carrier or service provider. Transmissions to and from the radio/network interface 535 are conducted under control of the operating system 520, which disseminates communications received by the radio/network interface 535 to application programs 510 and vice versa. The radio/network interface 535 allows system 500 to communicate with other computing devices, including server computing devices and other client devices, over a network.

In various implementations, data/information stored via the system 500 may include data caches stored locally on the device or the data may be stored on any number of storage media that may be accessed by the device via the radio/network interface 535 or via a wired connection between the device and a separate computing device associated with the device, for example, a server computer in a distributed computing network, such as the Internet. As should be appreciated such data/information may be accessed through the device via the radio interface 535 or a distributed computing network. Similarly, such data/information may be readily transferred between computing devices for storage and use according to well-known data/information transfer and storage means, including electronic mail and collaborative data/information sharing systems.

An audio interface 540 can be used to provide audible signals to and receive audible signals from the user. For example, the audio interface 540 can be coupled to a speaker to provide audible output and to a microphone to receive audible input, such as to facilitate a telephone conversation or voice commands. System 500 may further include video interface 545 that enables an operation of an optional camera (not shown) to record still images, video stream, and the like. The video interface may also be used to capture certain images for input to a natural user interface (NUI).

Visual output can be provided via a display 555. The display 555 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 555 may include functionality to be a touchscreen display. The display 555 may be a projected display. The display 555 may be integrated with the system 500 such as when the system 500 is embodied as a phone or tablet. The display 555 may be connected via wired or wireless means.

The methods and processes described herein can be embodied as code and/or data. The software code and data described herein can be stored, for example as modules, on one or more computer readable media, which may include any device or medium that can store code and/or data for use by a computer system. As used herein, computer readable storage media/medium should not be construed to consist of transitory propagating signals.

Accordingly, embodiments of the subject invention may be implemented as a computer process, a computing system, or as an article of manufacture, such as a computer program product or computer-readable storage medium. Certain embodiments of the invention contemplate the use of a machine in the form of a computer system within which a set of instructions, when executed, can cause the system to perform any one or more of the methodologies discussed above, including providing a software tool or a set of software tools that can be used during the physical design of integrated circuits and/or printed circuit boards and/or system level design. The set of instructions for the software tool can be stored on a computer program product, which may be one or more computer readable storage media readable by a computer system and encoding a computer program including the set of instructions and other data associated with the software tool.

A software tool is a software implement to help carry out a particular function (or functions). The described software tool can make decisions or take actions such as placement of gates or transistors or design blocks or chips, routing of gates or transistors or design elements or chips, and power supply design and/or power supply grid design and layout. The action are guided by the effect that these actions might have on dependence of the power consumption of the circuit elements, design blocks, and/or chips on any data that is being processed, stored, or transported in the integrated circuit and/or printed circuit board. The actions taken by the software tool may be adjusted, modified, or enhanced to mitigate the variation/dependence of the power consumption (voltage and/or current) as observed externally by means of observing the voltage/current signature at the supply pins of a chip/system/board and/or by observing the variation of the electromagnetic radiation nearby the chip or system.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A computer readable storage medium having instructions stored thereon for an electronic design automation tool that when executed by a processing system, direct the processing system to:

add charge storage elements and switching elements to a power frame;

identify an attach ratio for one or more types of standard cells, wherein the attach ratio is a number of standard cells attached to a charge storage element and is based at least on types of gates of the standard cells;

place the standard cells in groupings to attach to corresponding charge storage elements according to the attach ratio; and vary routing length of connections between the standard cells and the charge storage elements of each grouping to optimize data leakage through power signature, wherein the instructions to identify the attach ratio and place the standard cells in groupings direct the processing system to:

minimize clusters of a same gate type in a grouping.

2. The medium of claim 1, wherein the instructions to add the charge storage elements and switching elements to the power frame direct the processing system to:

insert a charge storage element and corresponding switching elements between each power rail belonging to an isolated section and the power frame.

3. The medium of claim 1, wherein the instructions to add the charge storage elements and switching elements to the power frame direct the processing system to:

insert a charge storage element and corresponding switching elements between each ground rail belonging to an isolated section and the power frame.

4. The medium of claim 1, wherein the instructions to identify the attach ratio and place the standard cells in groupings further direct the processing system to:

determine an optimized attachment arrangement based on mitigating dependence of switching to one or both of power consumption and electromagnetic radiation.

5. The medium of claim 1, wherein the instructions to identify the attach ratio and place the standard cells in groupings further direct the processing system to:

optimize placement based on number of gates in a grouping.

* * * * *